INVENTOR
John E. Poorman, Deceased
Dora E. Kurtz, Executrix
BY *Mirick & Smiley*
ATTORNEY INVENTOR
John E. Poorman, Deceased
Dora E. Kurtz, Executrix
BY
ATTORNEY 3,062,080
SWING TOOLHOLDER
John E. Poorman, deceased, late of Philadelphia, Pa., by Dora E. Kurtz, executrix, Philadelphia, Pa., assignor, by mesne assignments, to Somma Tool Company, Incorporated, Waterbury, Conn., a corporation of Connecticut
Filed July 30, 1958, Ser. No. 752,126
5 Claims. (Cl. 82—24)

This invention relates to a combination right and left hand swing toolholder for use in multispindle automatic indexing machines, turret lathes or the like.

In production of parts on multispindle automatic indexing machines and turret lathes, it is frequently necessary to operate on workpieces at points spaced from the ends thereof and in such cases, it has been the practice to employ auxiliary tools mounted on slides rather than a turret mounted tool. This arrangement is disadvantageous as it complicates the operation of the machine and interferes with the working cycle of the machine.

Moreover, it is frequently desirable to reverse the rotation of the work and the operation of the machine in order to change from cutting right to left hand threads or to enable access of a tool bit to a particular surface of the work. When this is done, it is necessary to change all of the toolholders at other work stations so that they may properly perform their cutting operations, such as recessing, undercutting, cutoff, etc. Toolholders of known variety are commonly made to accommodate only a right or a left hand cutter and not both. In the indicated circumstances, it is, therefore, necessary to stop the machine and undergo a prolonged down time to substitute the appropriate toolholder and change the tool.

Having in mind the defects of the prior art apparatus, it is the primary object of the present invention to provide a turret mountable swing tool capable of operating on workpieces at points spaced from the free ends thereof.

It is a further object of this invention to provide a toolholder of the swing type which will enable quick change of the cutting tool from right to left hand cutting, or vice versa, without the need to reposition or substitute a different holder.

It is another object of the invention to provide a toolholder of the swing type which supports a standard cutter holder in separate locations to enable the change from right to left hand cutting by merely removing the standard cutter holder from one clamp and inserting it in a second clamp.

It is a further object of the invention to provide a quick change, combination right and left hand toolholder having a crank arm pivoted at one end and adapted to swing a cutter, from either of two holding positions, about the pivot into the work.

Another object of the invention is to provide a combination right and left hand swing toolholder of the character described which is provided with a single, adjustable cam follower which turns the holder on its pivot to move the tool bit into the work responsive to pressure of a cam mounted on a cross-slide of a machine.

A still further object of the invention is to provide a combination toolholder of the character indicated in which the pivotal movement of the holder crank arm is adjustably limited and the holder is provided with resilient means to return the cutter to its initial position after completion of each cut.

Yet another object of the invention is to provide a combination left and right hand cutting toolholder which is of simple and sturdy construction, economical to manufacture, and whose use will result in more economical production of machined pieces.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 3:
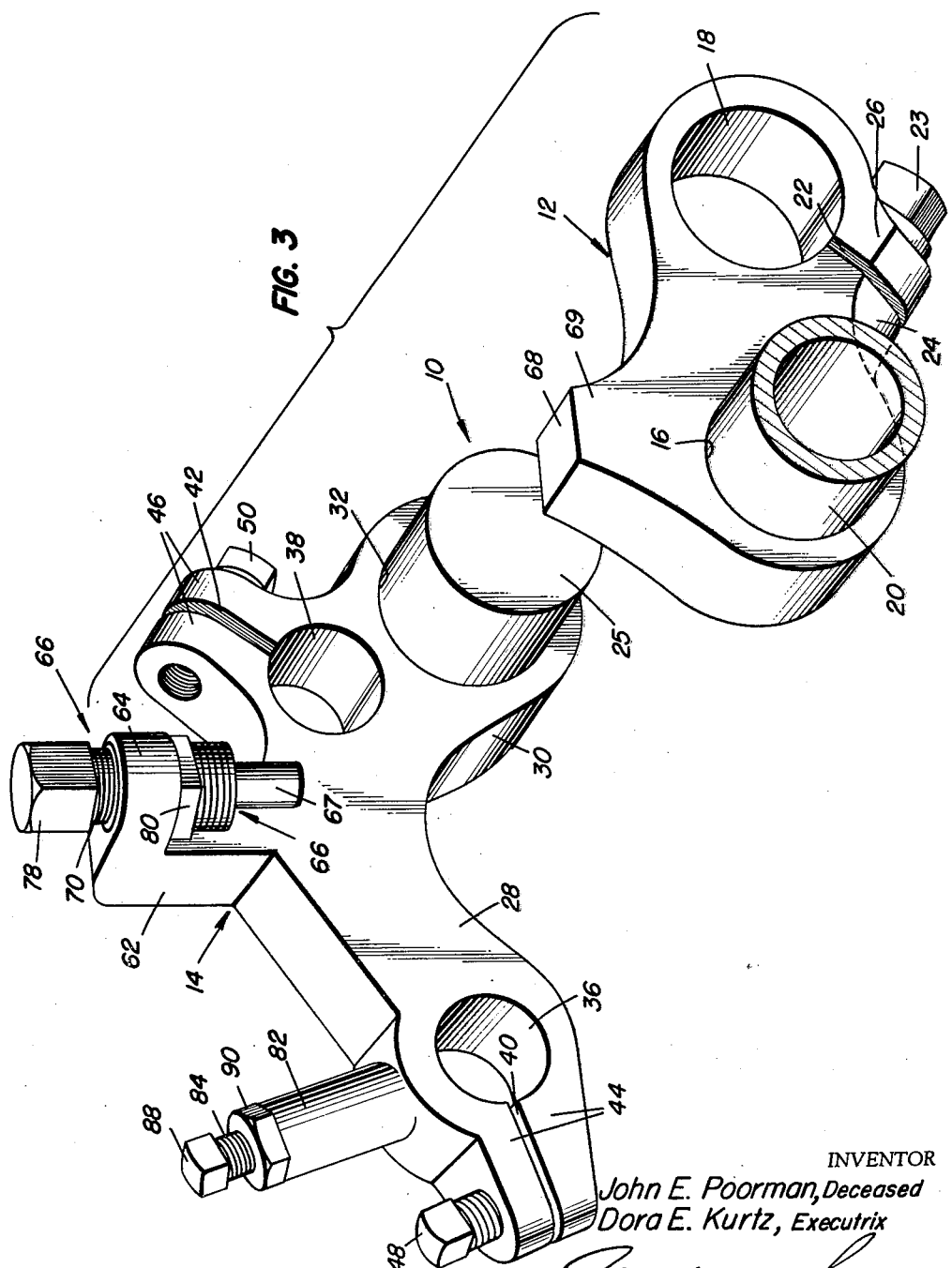
FIG. 3 is an exploded view in perspective of the toolholder taken from the opposite side of the toolholder from that shown in FIG. 1.

Referring now to the drawings, a preferred embodiment of the invention comprises a holder 10 including two bodies or arms 12 and 14. The arm 12 serves to mount the holder in the tool station and provides for a pivot on which is swingably mounted the arm 14 carrying the tool bit. Arm 12 is shaped generally like the figure eight, as best shown in FIG. 3, having apertures 16 and 18. A shank or shaft 20, preferably hollow or tubular, is fixedly secured in aperture 16 by a drive fit, threads, pins or other means.

Figure 1:
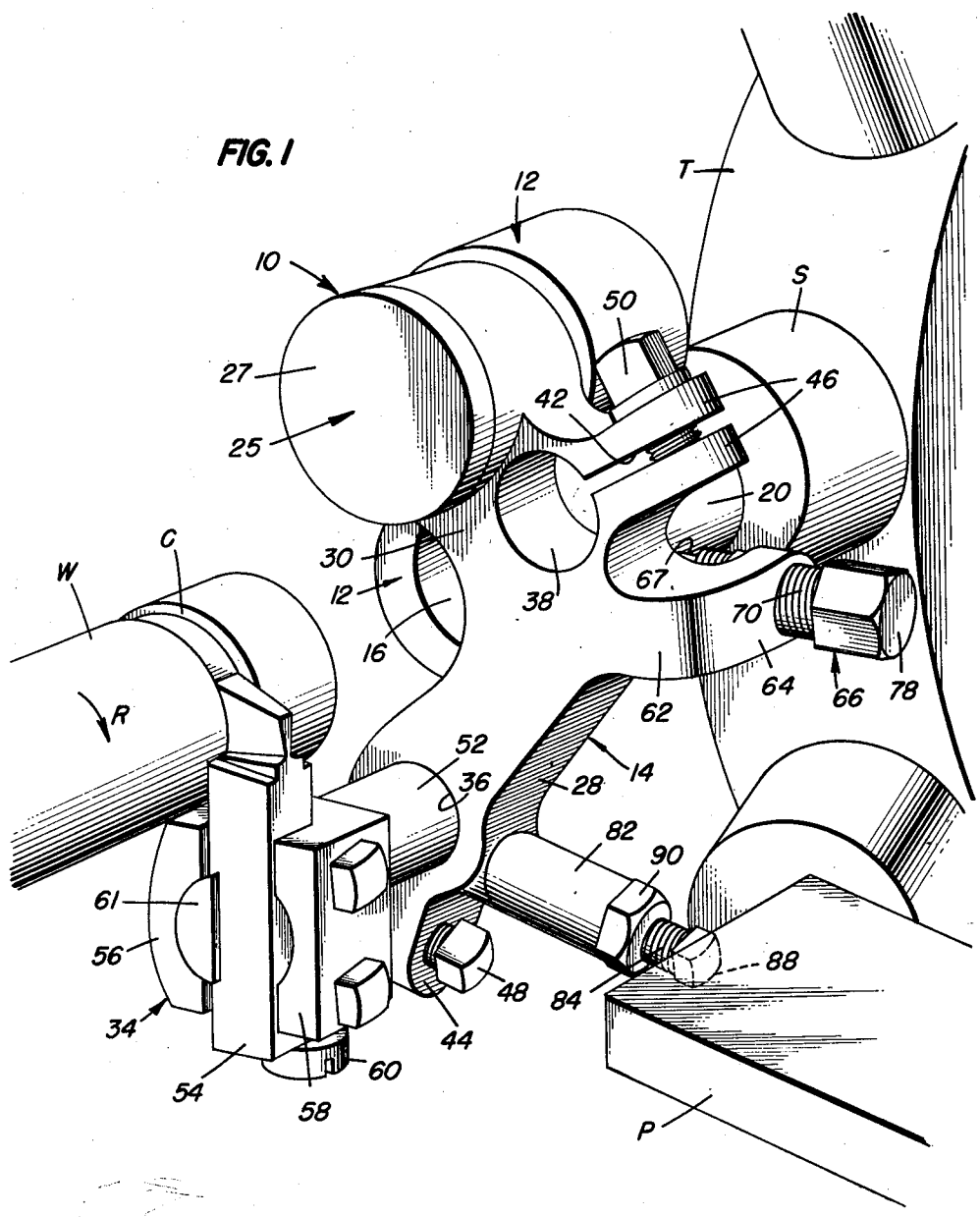
FIG. 1 is a view in perspective of a toolholder constructed in accordance with the invention, mounted on a turret lathe partially shown, and holding a cutter in position for right hand cutting.

The shaft 20 is shown in FIG. 1 clamped in a tool station S on the turret T of a turret lathe. It may be mounted at other work stations, as for example, on a multispindle automatic indexing machine. The axis of shaft 20 preferably is aligned with the center line of the workpiece W. The axes of openings 16 and 18 are parallel and off-set from each other. Opening 18 is intersected by a slot 22 in arm 12 between outwardly extending lugs 24 and 26, and a clamping screw 23 is provided for threaded engagement with one of a pair of aligned openings in the lugs to move them into clamping engagement about the end of a pivot pin 25 on which the arm 14 is pivotally mounted.

The arm 14 has the shape of a bent crank with angularly disposed arms 28 and 30. An opening 32 is provided at the end of arm 30 to rotatably receive the pivot pin 25 which has a head 27, best shown in FIG. 1, for retaining the crank arm 14 thereon. Each arm of crank 14 is apertured to receive and clamp a standard cutter holder 34. These apertures 36 and 38 are similar to aperture 18 in arm 12, each being respectively intersected by slots 40 and 42 to form clamping jaws 44 and 46 having aligned openings, one of which is threaded to cooperate with clamp screws 48 and 50 to clamp the shaft or bar 52 of the cutter holder 34 within the aperture 36 or 38.

The tool bit holder 34 comprises a tool bit or cutter 54 clamped between the jaws 56 and 58, longitudinal adjustment of the tool bit being precisely obtained by the micrometer screw 60. A rocker 61 is provided between jaw 56 and the tool bit 54 for precise adjustment of the tilt of the cutting edge. The tool bit holder 34 is of standard construction and in common use and, therefore, is not claimed herein as part of the invention.

Figure 4:
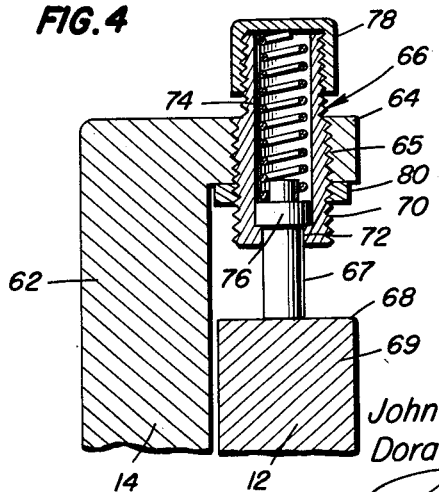
FIG. 4 is a fragmentary cross-sectional view taken on line 4—4 of FIG. 2.

The crank arm 14 is additionally provided with a projecting lug 62 having an inturned shoulder 64. As best shown in FIG. 4, shoulder 64 is provided with a threaded opening 65 which receives a threaded spring actuated retracting member 66 including an abutment pin 67 that engages an abutment face 68 of a boss 69 on the arm 12 to limit the rotary movement of crank arm 14 about pivot pin 25 and to return the crank arm 14 to its position of rest. The retracting member 66 comprises an externally threaded, cylindrical housing 70 which is open at its outer end and has an aperture 72 in its inner end for passing the abutment pin 67. A coiled spring 74 is positioned in the housing 70 to bear on an annular retaining shoulder 76 on the inner end of the pin 67, and the spring 74 is retained and tensioned by a cap 78 threaded over the open end of the housing 70. The housing 70 is selectively threaded through the opening 65 and may be secured by a lock nut 80.

The crank arm 14 is additionally provided, near the end of its arm 28, with a tubular boss 82 having an internally threaded bore to receive a cam follower screw 84. A cam or pusher P, mounted on a cross slide of the lathe, is adapted to bear against the head 88 of the follower screw 84 to move the crank arm 14 toward the workpiece W and in opposition of the spring actuated retracting member 66. A lock nut 90 serves to secure the screw 84 in any adjusted position in boss 82 according to the desired depth of cut C into the work W by the tool 54.

In the use of the described swing toolholder, the operator will first secure the shank 20 in a tool station S on the turret T of a turret lathe, as shown in FIG. 1. If the cutting operation and other operations in the other tool stations involve right hand turning, the cutter holder 34 will be mounted in aperture 36, as shown in FIG. 1, and clamped therein by means of screw 48, the tool 54, illustrated as a bit for undercutting, being adjusted in the holder 34 to properly engage the workpiece W.

The adjusting screw 84 is then turned to the proper position to engage the cam pusher P and adjust the stroke of the crank arm 14 and cutter 54. The cam pusher P on the cross-slide of the turret lathe may also require adjustment for length of stroke. If desired, the head 88 of the screw 84, may be pushed automatically by pneumatic means. Screw 84 is locked in the adjusted position by nut 90. The screw housing 70 is then turned to extend or retract pin 67 which precisely limits the depth of the cut C by stopping the movement of the crank arm 14.

Figure 2:
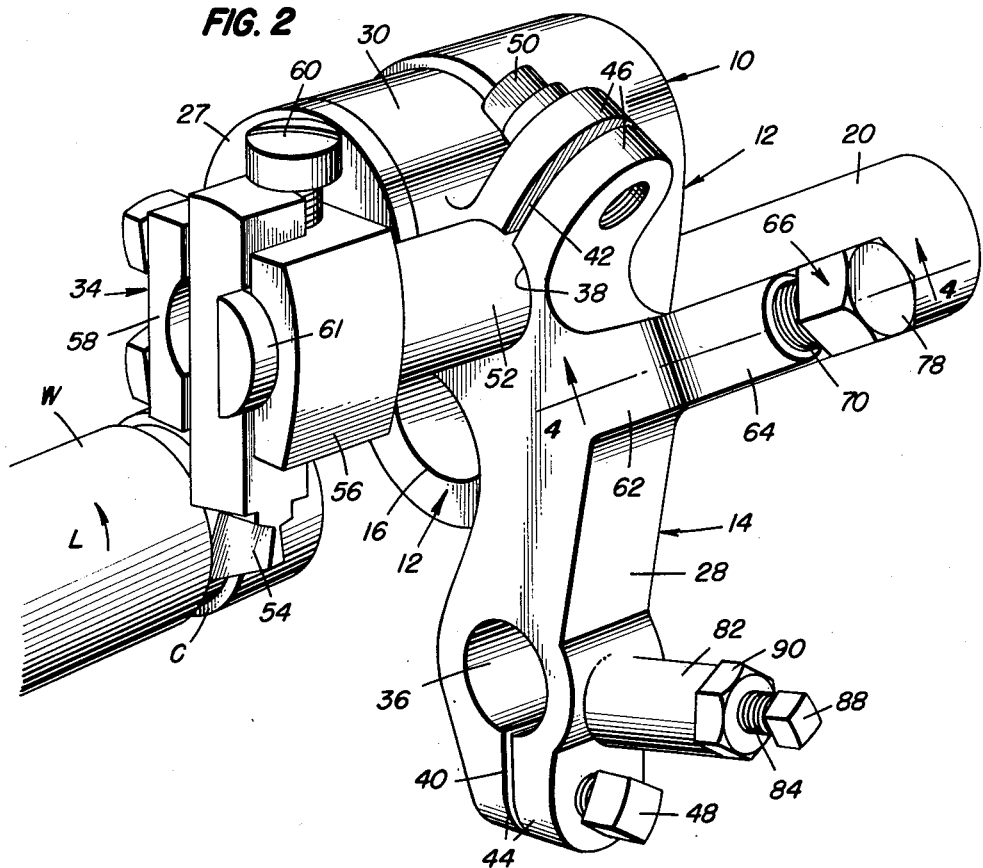
FIG. 2 is a view in perspective of the toolholder similar to FIG. 1, but showing the same cutter positioned for left hand cutting.

The machine may then be operated automatically or manually to actuate the cross-slide cam or pusher P each time a cut is scheduled on a workpiece W with tool bit 54, and with each pushing operation, the crank arm 14 turns on pivot pin 25 to the limit set by the member 66. At the completion of each cut, spring 74 bearing on pin 67 returns the crank arm 14 to its original position with the cutter 54 spaced laterally from the work. At any time that it becomes desirable or necessary to change to a left hand cutting tool, the machine is stopped, screw 48 is turned to unclamp the cutter holder 34 which is then removed and shaft 52 is inserted in the other aperture 38 with the cutter 54 turned 180° to extend downwardly and reversed in holder 34, as shown in FIG. 2. The other clamp screw 50 is tightened after the cutter has been properly positioned and adjusted for the left hand turning operation.

The machine may operate for left hand turning until it is again necessary to move the tool bit holder 34 to the aperture 36 for right hand turning. In FIGS. 1 and 2, an undercutting tool bit 54 is illustrated in process of cutting the groove C in the workpiece W. In FIG. 1, the work is turning clockwise in the direction of arrow R when viewed from the turret end of the machine. When the tool bit and its holder 34 are positioned as shown in FIG. 2, the machine has been reversed and the work is turning counterclockwise in the direction of arrow L when viewed from the turret end of the machine.

It will be apparent that the described swing tool has many advantages stemming from the ability to quickly make the change from right to left hand turning position of the tool bit and its universal holder. The swing holder, by selection of an appropriate cutter, is adapted for use not only for undercutting but also for recessing, knurling, cutoff and other operations.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed and desired to be secured from Letters Patent is:

1. A toolholder comprising a body including a first arm and a second arm, said first arm having a shank projecting laterally from one end thereof for securement to a support, a pivot pin carried by the first arm at the other end and projecting laterally in the opposite direction from said shank, said second arm being pivotally mounted at one end on said pivot pin and having a first tool securing means at the other end of said arm and a second tool securing means intermediate said pivot pin and said first tool securing means, said tool securing means each comprising an opening in said second arm and clamp means for securing a tool in said opening, the axes of said openings being parallel to each other and the axes of said pivot pin and said shank, an abutment on one of said arms, spring means on the other of said arms and engaging said abutment to rotate the second arm on the pivot pin in one direction, and means on said second arm for rotating the arm in a second direction.

2. A toolholder as in claim 1 wherein the tool comprises two arm portions joined in L-shaped arrangement, one arm portion arranged to be inserted in said first or second openings and said second arm portion arranged to have cutting edges facing the axis of said shank when the tool is inserted in either opening, whereby said tool may be mounted in the first opening for right hand turning and may be removed and mounted in said second opening for left hand turning.

3. A toolholder as in claim 1 wherein the tool comprises a tool bit holder including an arm portion arranged to be inserted in one of said tool securing openings and a body portion carried by said arm portion and having means for supporting a tool bit substantially at right angles to said arm portion to have cutting edges facing the axis of said shank when the arm portion is inserted in either opening, whereby said tool may be mounted in the first tool securing opening for right hand turning and may be removed and mounted in said second tool securing opening for left hand turning, and stop means on said body portion juxtaposed with said tool bit supporting means for accurately locating a tool bit in said supporting means, whereby a tool bit may be removed from said supporting means and repositioned therein against said stop means to maintain the same relative position of the tool bit relative to the tool bit holder.

4. A toolholder as in claim 3 wherein said tool bit supporting means comprises a clamp extending across said body portion, and said stop means comprises a micrometer adjustment screw threaded into the body portion at the rear of said clamp and forming an abutment for engagement with the rear end of a tool bit positioned in said clamp.

5. A toolholder comprising a body including a first arm and a second arm, said first arm having a shank projecting laterally from one end thereof for securement to a support, a clamp at the other end of the first arm, a pivot pin securable in said clamp and projecting laterally of said first arm in the opposite direction from said shank, said second arm being pivotally mounted at one end on said pivot pin and having a first tool securing means at the other end of said arm and a second tool securing means intermediate said pivot pin and said first tool securing means, said tool securing means each comprising an opening in said second arm and clamp means for securing a tool in said opening, the axes of said openings being parallel to each other and the axes of said pivot pin and said shank, the spacing between the axes of said pivot pin and shank being lesser than that between the axes of said pivot pin and first securing means opening and greater than that between the axes of said pivot pin and said second securing means opening, an abutment face on said first arm, a laterally projecting shoulder on said second arm overlying said first arm and spaced radially from said pivot pin by a distance substantially equal to the radial spacing of said abutment face from the pivot pin so that said shoulder is movable toward an away from said abutment face, abutment means carried by said shoulder and including a retractable abutment pin engaged with said abutment face and resilient means engaging and normally urging the abutment pin to extended position tending to separate said first and second arms by moving said shoulder away from said abutment face, and a cam follower carried by said second arm in spaced relation to said pivot pin and operative upon engagement with a cam to controllably swing said second arm about said pivot pin in opposition to said resilient member, whereby to engage a tool carried by said second arm with the work and said resilient means will disengage the tool upon release of said cam follower.

References Cited in the file of this patent

UNITED STATES PATENTS

| | | |
|---|---|---|
| 1,963,023 | Libby | July 24, 1931 |
| 2,078,352 | Summers | Apr. 27, 1937 |
| 2,369,555 | Freeman | Feb. 13, 1945 |
| 2,404,859 | Melling | July 30, 1946 |
| 2,425,242 | Herring | Aug. 5, 1947 |
| 2,724,302 | Poorman | Nov. 22, 1955 |
| 2,834,106 | Conder | May 13, 1958 |

FOREIGN PATENTS

| | | |
|---|---|---|
| 120,712 | Australia | Dec. 10, 1945 |